United States Patent [19]

Valco

[11] 4,308,997
[45] Jan. 5, 1982

[54] RECUTTER SCREEN BAFFLE

[75] Inventor: Thomas D. Valco, Weslaco, Tex.

[73] Assignee: International Harvester Company, Chicago, Ill.

[21] Appl. No.: 187,104

[22] Filed: Sep. 15, 1980

Related U.S. Application Data

[63] Continuation of Ser. No. 58,701, Jul. 18, 1979, abandoned.

[51] Int. Cl.³ .............................................. B02C 18/22
[52] U.S. Cl. ................................. 241/47; 241/101.7; 241/222
[58] Field of Search ................ 241/47, 57, 101.7, 221, 241/222

[56] References Cited

U.S. PATENT DOCUMENTS

| | | | |
|---|---|---|---|
| 3,566,943 | 3/1971 | Witt | 241/222 X |
| 3,635,271 | 1/1972 | Markham | 241/101.7 X |
| 3,805,660 | 4/1974 | Burrough | 241/222 UX |
| 3,873,038 | 3/1975 | Wagstaff | 241/221 X |

*Primary Examiner*—Howard N. Goldberg
*Attorney, Agent, or Firm*—Dennis K. Sullivan; F. David AuBuchon

[57] ABSTRACT

A forage harvester having a cutterhead housing, a rotary reel cutterhead, a recutter screen mounted adjacent the cutterhead periphery and a crop blower for generating an air suction in the outlet of the cutterhead housing is provided with a transverse baffle sheet disposed within the housing in spaced relation from the floor to define the upper side of an air duct separated from the operative region of the recutter screen and extending from beneath the cutterhead area to direct the inlet air across the floor of the cutterhead housing to the discharge mechanism.

5 Claims, 2 Drawing Figures

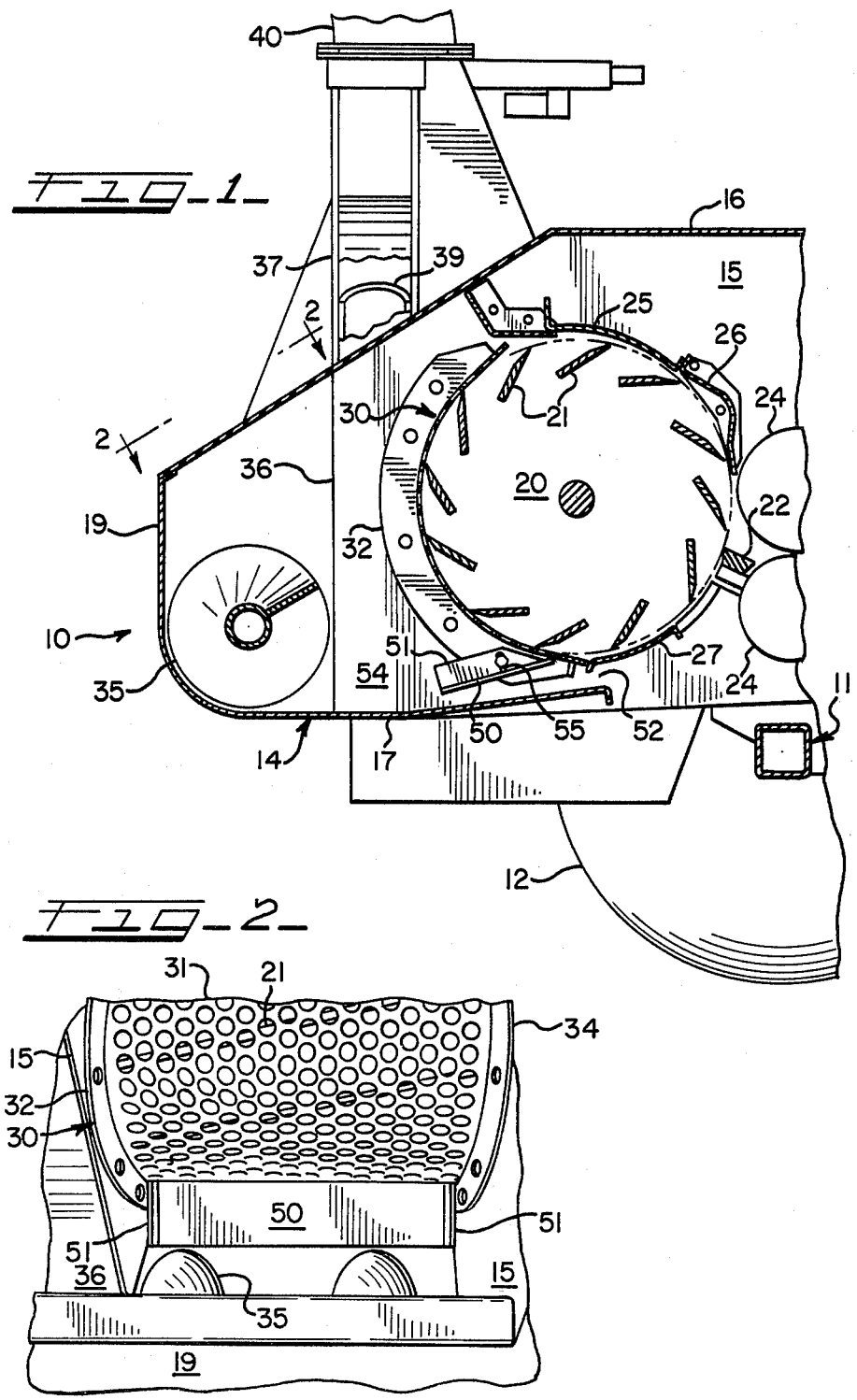

RECUTTER SCREEN BAFFLE

This is a continuation of application Ser. No. 058,701, filed July 18, 1979, now abandoned.

BACKGROUND OF THE INVENTION AND THE PRIOR ART

This invention relates to forage harvesters of the type having a rotary reel type cutterhead in which crops previously harvested or gathered by an associated header are finely chopped to produce silage and, more particularly, to an attachment therefor for assisting the discharge of the crop from the cutterhead housing when a recutter screen is utilized in conjunction with the cutterhead for chopping certain types of crops, such as ear corn.

It is previously known to provide a forage harvester of the type described with a recutter screen attachment for use in grinding ear corn silage, as well as for certain other crops, such as haylage, whole corn silage, oat silage, etc. Such are illustrated, for example, in U.S. Pat. Nos. 3,525,375, 3,566,943, 3,829,030, and 3,946,954. However, a problem which may occur in a machine normally designed for use without a recutter screen is that certain types of chopped material, such as ear corn, may tend to pile up on the floor of the cutterhead housing forward of the crop discharge mechanism.

Accordingly, it is an object of the invention described herein to provide an air flow across the floor of the cutterhead housing of a forage harvester having a recutter screen to ensure the movement of chopped material into the discharge mechanism.

A more specific object of the invention is to provide an auxiliary baffle sheet for use in conjunction with a forage harvester recutter screen wherein the baffle forms, with the bottom and sides of the cutterhead housing, an air duct for directing a stream of relatively higher velocity air along the floor of the cutterhead housing in the area of discharge of crops from the recutter screen.

The above objects and other objects as will hereinafter be seen, are specifically met in a forage harvester having a mobile main frame, a cutterhead housing mounted on the frame having a crop inlet and a crop outlet, a rotary reel cutterhead of the type having a plurality of peripherally disposed knife edges, a recutter screen mounted adjacent the cutterhead periphery on the crop outlet side for processing substantially all of the crops, and a discharge mechanism including a crop blower for generating an air suction in the outlet of the cutterhead housing. A transverse baffle sheet is disposed within the housing in spaced relation from the floor to define the upper side of an air duct separated from the operative region of the recutter screen and extending from beneath the cutterhead into the area of discharge of crops from the recutter screen for the purpose of directing the inlet air across the floor of the cutterhead housing to the discharge mechanism. The baffle is preferably angled downwardly rearwardly in a manner to increase the velocity of the air stream exiting the duct.

Other objects and advantages of the invention will become more apparent upon reference to the detailed description thereof and to the drawings, in which:

FIG. 1 is a longitudinal section of the rear portion of a forage harvester and illustrating the invention described herein; and FIG. 2 is a perspective view of the forage harvester illustrated in FIG. 1 as viewed along the line 2—2 thereof.

DETAILED DESCRIPTION OF THE PREFERRED EMBODIMENT

Turning to the drawings, there is shown in FIG. 1 a rear portion of a forage harvester generally designated 10 of the general type illustrated for example, in U.S. Pat. No. 3,730,441, issued May 1, 1973, including a frame assembly 11 supported by ground wheels 12. A cutterhead housing generally designated 14 is mounted on the frame and includes fore-and-aft extending side sheets 15, top sheet 16 and a discharge pan or floor sheet 17, the latter terminating in an upturned rear wall 19 forming the rear portion of an auger trough. Rotatably mounted within the cutterhead housing 14 is a rotary reel type cutterhead shown schematically at 20 which is provided adjacent its periphery with a plurality of cutting knives 21, which, when the cutterhead 20 is rotated, form a cylindrical cutting periphery. Disposed adjacent the periphery of the cutterhead 20 on the forward inlet side thereof is a stationary shear bar 22 which cooperates with the rotary knives 21 to chop crops fed to the cutting cylinder between the infeed rolls 24 disposed in the inlet of the housing 14 forwardly of the shear bar 22. Except in the region of the shear bar, the forward portion of the cutterhead periphery is substantially fully closed by peripheral sheets 25, 26, 27, which retain crops carried over within the cutterhead 20 from escaping forwardly of the cutterhead.

The rearward portion of the periphery of the cutterhead 20 is enclosed by a recutter screen 30 comprising foraminous cylindrical portion 31 disposed in closely spaced relation to the edges of the knives 21 and having retaining flanges 32, 34 at each end for bolting the screen to the side sheets 15 of the cutterhead housing 14. Although the recutter screen 30 is illustrated as having circular apertures it will be apparent from examining the above references that many other types of apertures are possible. Disposed rearwardly of the recutter screen 30 in the discharge outlet of the housing 14 is a transverse auger 35 for moving material transversely in the trough formed by the rear wall 19 and a forward wall 36, to the opposite side of the harvester from the cutterhead housing whereat the crops are infed into a crop blower 37 having paddles 39 rotatably driven thereinside which delivers material out through discharge chute 40 into a trailing forage wagon (not shown). It will be appreciated by those skilled in the art that the trough in which the transverse discharge auger 35 rides is enclosed at the top, as by plate 16, and that the crop blower 37 generates a suction in the auger trough and at the rear discharge outlet of the cutterhead housing 14.

In accordance with the invention, an air baffle 50 comprising a transverse planar sheet having upturned legs 51 adjacent its transverse ends is disposed within the cutting cylinder in spaced relation to the floor 17 in a manner forming with the cutterhead housing floor 17 and side walls 15, an air duct extending from the cutterhead housing air inlet 52 as between the lower wall 17 of the housing and the cutterhead rim sheet 27, into the discharge area 54 of crops passing through the recutter screen 30. The baffle sheet is mounted on the recutter screen flanges 32, 34 and the upturned ends 51 of the baffle sheet 50 are provided with slotted holes as at 55 to permit vertical adjustment of the baffle sheet, the forwardmost portion of the baffle sheet 50 abutting against the recutter screen 30 in the area below the operative or apertured region thereof. It will further be seen that the baffle sheet 50 slants downwardly rearwardly somewhat. This is done for two reasons; first, to create a venturi effect to increase the velocity of the air flowing through the duct and secondly to prevent material from accumulating on top of the sheet 50.

In operation, as crops are fed in by the feed rolls 24 in the cutterhead housing inlet, they will first be cut by the action of the rotary knives 21 and the shear bar 22. The crop will be further reduced in size by the action of the knives 21 against the recutter screen 30, the action continuing until substantially all of the crop exits through the apertures of the recutter screen. As the crops drop from the recutter screen into the discharge area 54 on the floor 17 of the cutterhead housing, the suction created by the crop blower 37 through the auger trough will cause the air to enter the housing inlet 52. The duct formed by the baffle sheet and housing will cause the air to be redirected with relatively high velocity along the floor of the cutterhead housing 17 in the discharge area 54 and blow the crops to the transverse auger 35 for transport to the blower 37 and ultimate discharge through the discharge spout 40.

Thus, it is apparent that there has been described in accordance with the invention a recutter screen baffle which fully satisfies the objects stated above. In light of the foregoing description it will be apparent that various modifications can be made without departing from the true scope of the invention. Accordingly, it is intended to embrace such modifications as may fall within the scope of the appended claims.

What is claimed is:

1. A forage harvester having a mobile main frame, an enclosed cutterhead housing mounted on said frame and having a crop inlet opening and a crop discharge, a rotary reel type cutterhead mounted in the housing and having a plurality of knives with edges generating a cylindrical periphery upon the rotation of the cutterhead, a shear bar mounted closely adjacent the cutterhead periphery on the crop inlet side, an apertured recutter screen mounted closely adjacent said cutterhead periphery on the crop discharge side, substantially all of the crop exiting through the screen to the crop discharge, an air inlet in said housing below said shear bar, means for generating an air flow in said housing from said air inlet beneath the cutterhead to the discharge opening, and a transverse air baffle disposed vertically beneath a substantial portion of the apertured area of the recutter screen and above the floor of the housing and disposed to direct said air flow along the floor of said housing to the discharge opening.

2. The invention in accordance with claim 1 and said means for generating said air flow comprising a crop blower having its inlet in operative communication with said discharge opening.

3. In a forage harvester having a mobile main frame, a cutterhead housing mounted on the frame having fore-and-aft extending sidewalls and a floor connecting the sidewalls and having a forward crop inlet and a rearward crop outlet, a rotary cutterhead of the type having a plurality of peripherally disposed knife edges generating a cylindrical periphery upon rotation, a shear bar mounted adjacent the cutterhead periphery on the crop inlet side, a recutter means having a plurality of openings mounted adjacent the cutterhead periphery on the crop outlet side, substantially all of the crops processed by said cutterhead passing through said openings in said recutter means, and means for generating an air suction at said housing crop outlet, the improvement comprising a transversely extending baffle sheet disposed within the housing to define, with the bottom of the housing and a portion of the sides thereof, an air duct separated from the operative region of said recutter means and extending from an air inlet in said housing beneath the cutterhead vertically beneath a substantial portion of said recutter means openings and terminating in an air outlet into the area of discharge of crops from said recutter means.

4. The invention in accordance with claim 3 and said recutter means comprising a flanged screen and said baffle being mounted on said screen and removable from said harvester therewith.

5. In a forage harvester having a mobile main frame, a cutterhead housing mounted on the frame having fore-and-aft extending sidewalls and a floor connecting the sidewalls and having a forward crop inlet and a rearward crop outlet, a rotary cutterhead of the type having a plurality of peripherally disposed knife edges generating a cylindrical periphery upon rotation, a shear bar mounted adjacent the cutterhead periphery on the crop inlet side, a recutter means mounted adjacent the cutterhead periphery on the crop outlet side, substantially all of the crops processed by said cutterhead passing through said recutter means, and means for generating an air suction at said housing crop outlet, the improvement comprising a transversely extending baffle sheet disposed within the housing to define, with the bottom of the housing and a portion of the sides thereof, an air duct separated from the operative region of said recutter means and extending from an air inlet beneath the cutterhead into the area of discharge of crops from said recutter means, said baffle being angled downwardly rearwardly in a manner reducing the cross section of said duct rearwardly.

* * * * *